United States Patent
Cooper

(10) Patent No.: US 6,220,512 B1
(45) Date of Patent: Apr. 24, 2001

(54) SYSTEM AND METHOD FOR MANAGING BUSINESS MEETINGS

(76) Inventor: James R. Cooper, 768 S. University Dr., Riverside, CA (US) 92507

( * ) Notice: Subject to any disclaimer, the term of this patent is extended or adjusted under 35 U.S.C. 154(b) by 0 days.

(21) Appl. No.: 09/148,009

(22) Filed: Sep. 4, 1998

(51) Int. Cl.[7] .................................................. G06K 5/00
(52) U.S. Cl. ........................... 235/382; 235/382; 368/29; 368/79
(58) Field of Search .................... 235/382, 385, 235/462.1, 462.18; 368/29, 30, 46, 79, 92, 186, 278; 705/418

(56) References Cited

U.S. PATENT DOCUMENTS

| | | | |
|---|---|---|---|
| 4,164,038 | 8/1979 | Nachtigal | 364/705 |
| 4,266,278 | 5/1981 | Ebihara et al. | 364/705 |
| 4,445,181 * | 4/1984 | Yatman | 364/464 |
| 4,502,788 | 3/1985 | Lowden | 368/10 |
| 4,853,495 * | 8/1989 | Ouchi et al. | 235/375 |
| 5,444,673 | 8/1995 | Mathurin | 368/63 |
| 5,508,977 | 4/1996 | Tymn | 368/10 |
| 5,606,497 | 2/1997 | Cramer et al. | 395/232 |
| 5,842,009 * | 11/1998 | Borovay et al. | 364/705 |
| 5,936,542 * | 8/1999 | Kleinrock et al. | 235/492 |
| 5,991,742 * | 11/1999 | Tran | 705/32 |

* cited by examiner

Primary Examiner—Karl D. Frech
Assistant Examiner—Daniel St. Cyr
(74) Attorney, Agent, or Firm—Lyon & Lyon LLP

(57) ABSTRACT

A system and method for monitoring and/or managing a business meeting, the system including a processor, memory circuitry, timer circuitry, a display and an electronic sensor. The electronic sensor scans an identification device of each attendee arriving at or withdrawing from the meeting to acquire individual unit time cost and/or individual identification data. The processor adds or subtracts individual unit time cost data to a total unit time cost parameter stored in the memory circuitry each time that an identification device is scanned by the electronic sensor, and calculates a metered cost parameter based upon the total unit time cost parameter and elapsed time data from the timer circuitry. The processor also increases or decrease a total number of attendees parameter each time an identification device is scanned. The system displays a number of time and/or cost related parameters of the meeting, such as the metered cost, the total elapsed time, and the total number of attendees. The system may be coupled to an external computer system to remotely monitor and/or to download data from the meeting.

20 Claims, 4 Drawing Sheets

SYSTEM AND METHOD FOR MANAGING BUSINESS MEETINGS

FIELD OF THE INVENTION

The present invention relates generally to management systems, and more particularly to systems and methods for monitoring and managing business meetings and similar business activities.

BACKGROUND

Meetings are held frequently, often daily, within business and government organizations at virtually every organizational level. Managers and staff often have to routinely check their calendars and set aside time for meetings they have planned for others, and/or for meetings that others have planned that include them.

These meetings typically consume substantial amounts of time and energy from those required to attend, and there may be little measurable or tangible payback to the organization for their costs. Meetings may create managerial dilemmas because of their assumed necessity, and they tend to control schedules, actions and throttle work product of managers and executives throughout an organization. Effective management of business meetings has simply defied simple, practical and enduring solutions. Many books have been written on techniques for conducting effective business meetings with little or no measurable effect on productivity or reducing cost.

Accordingly, there is a need for systems and methods for more effectively monitoring and/or managing business meetings and the time and costs associated with them.

SUMMARY OF THE INVENTION

The present invention is directed to systems and methods for monitoring and/or managing business meetings and similar business activities. In accordance with one aspect of the present invention, a system is provided for monitoring time and/or cost related parameters of a meeting activity attended by one or more attendees. The system includes memory circuitry, timer circuitry, and a processor coupled to the memory circuitry and the timer circuitry. The memory circuitry stores a total unit time cost parameter that is a sum of individual unit time cost data of each attendee of the meeting activity. The timer circuitry, preferably a real time clock, provides elapsed time data during the course of the meeting.

The processor calculates a metered cost parameter based upon the total unit time cost parameter stored in the memory circuitry and the elapsed time data provided by the timer circuitry. The processor may also calculate a total elapsed time parameter based upon the difference between a current time value and a start time value provided by the timer circuitry at the beginning of the meeting activity, and/or may store a total number of attendees parameter in the memory circuitry, indicating the number attendees attending the meeting.

In addition, the system includes a display device coupled to the processor for displaying the metered cost parameter. The display device is preferably a liquid crystal display (LCD), and more preferably includes a plurality of liquid crystal displays for displaying a plurality of predetermined time and/or cost related parameters in addition to the metered cost parameter. For example, the total number of attendees, the total unit time cost parameter, a start time for the meeting, a planned duration for the meeting, the total elapsed time since the start of the meeting, current real time, and the like may be displayed using the system. Thus, the system may be prominently displayed at a meeting site for all attendees to see, the system displaying dynamic time and cost elements of the meeting activity. The visual and constant reminder provided may facilitate keeping the meeting focused and productive.

In a preferred form, the system also includes an electronic sensor, such as a bar code reader, for scanning an identification device of each attendee, such as an identification card, to acquire the individual unit time cost data. The processor adds or subtracts individual unit time cost data to the total unit time cost parameter stored in the memory circuitry each time that an identification device is scanned by the electronic sensor, i.e., each time an attendee arrives at or withdraws from the meeting. The processor preferably extracts the individual unit time cost data from individual identification data acquired from the identification devices scanned by the electronic sensor. Alternatively, the system may include a storage device, and the processor may extract the individual unit time cost data from the storage device based upon an individual identifier code acquired from the identification device scanned by the electronic sensor. The processor may also increase or decrease a total number of attendees parameter stored in the memory circuitry each time that an identification device is scanned by the electronic sensor.

The system may also include an interface panel, for example, including an input port and/or an output port, for coupling the system to an external computer. The interface panel may facilitate uploading of software or data into the system and/or downloading the parameters monitored and stored by the system for subsequent analysis. More preferably, the interface panel enables the system to be coupled to an organization's server or other computer network. The system and the monitored parameters may then be remotely monitored from a central location during the course of a meeting, e.g., to locate a specific executive or other individual attendee.

More importantly, the data monitored by the system may be used by an organization's management information or accounting departments. The resulting data may be compiled to facilitate analysis of meeting activities, to promote accountability, efficiency and lower costs.

In accordance with another aspect of the present invention, a method is provided for monitoring a meeting activity at a meeting site attended by one or more attendees. Initially, an electronically stored total unit time cost parameter may be increased or decreased by a predetermined value when an attendee arrives at or withdraws from the meeting site, respectively, e.g. in memory circuitry. An elapsed time parameter of the meeting activity may be monitored, for example, using a real time clock.

A metered cost parameter of the meeting activity may be electronically calculated based upon the total unit time cost and elapsed time parameters, and the metered cost parameter may then be displayed at the meeting site, for example on an LCD display. In addition, an electronically stored total number of attendees parameter may also be increased or decreased when an attendee arrives at or withdraws from the meeting site, respectively, and this parameter may also be displayed. More preferably, the elapsed time includes a plurality of periodic time values, e.g. one minute intervals, and the metered cost parameter is calculated by periodically comparing current values of the total unit time cost parameter with the respective periodic time values.

In one preferred form, each attendee has an identification device including individual unit time cost data thereon, and an electronic sensor is provided for reading the identification device for acquiring the individual unit cost data. The identification device of an attendee may be scanned with the electronic sensor, thereby acquiring the attendee's individual unit time cost data to be electronically stored, for example, in the memory circuitry. In addition, the identification device may include individual identification data, and the individual identification data may also be electronically stored when the identification device is scanned. More preferably, the electronic sensor is a bar code reader, and the identification devices are individual identification cards including a bar code including the individual unit time cost data thereon.

More preferably, an electronic system is provided at the meeting to facilitate the method of monitoring time and cost-related parameters of a business meeting at the meeting site, the system including a processor, a timer, the memory circuitry and a display, such as that described above. Individual identification data corresponding to each attendee in attendance at the meeting site may be stored in the memory circuitry. Individual unit time cost data may be added to or subtracted from the memory circuitry in response to the individual identification data, thereby providing a total unit time cost parameter corresponding to all of the attendees at the meeting site. Elapsed time data may be provided by the timer, a total metered cost of the meeting may be calculated by the processor by comparing the total unit time cost parameter to the elapsed time data, and the total metered cost may be displayed on the display.

Other objects and features of the present invention will become apparent from consideration of the following description taken in conjunction with the accompanying drawings.

DETAILED DESCRIPTION OF THE PREFERRED EMBODIMENTS

Figure 1A:
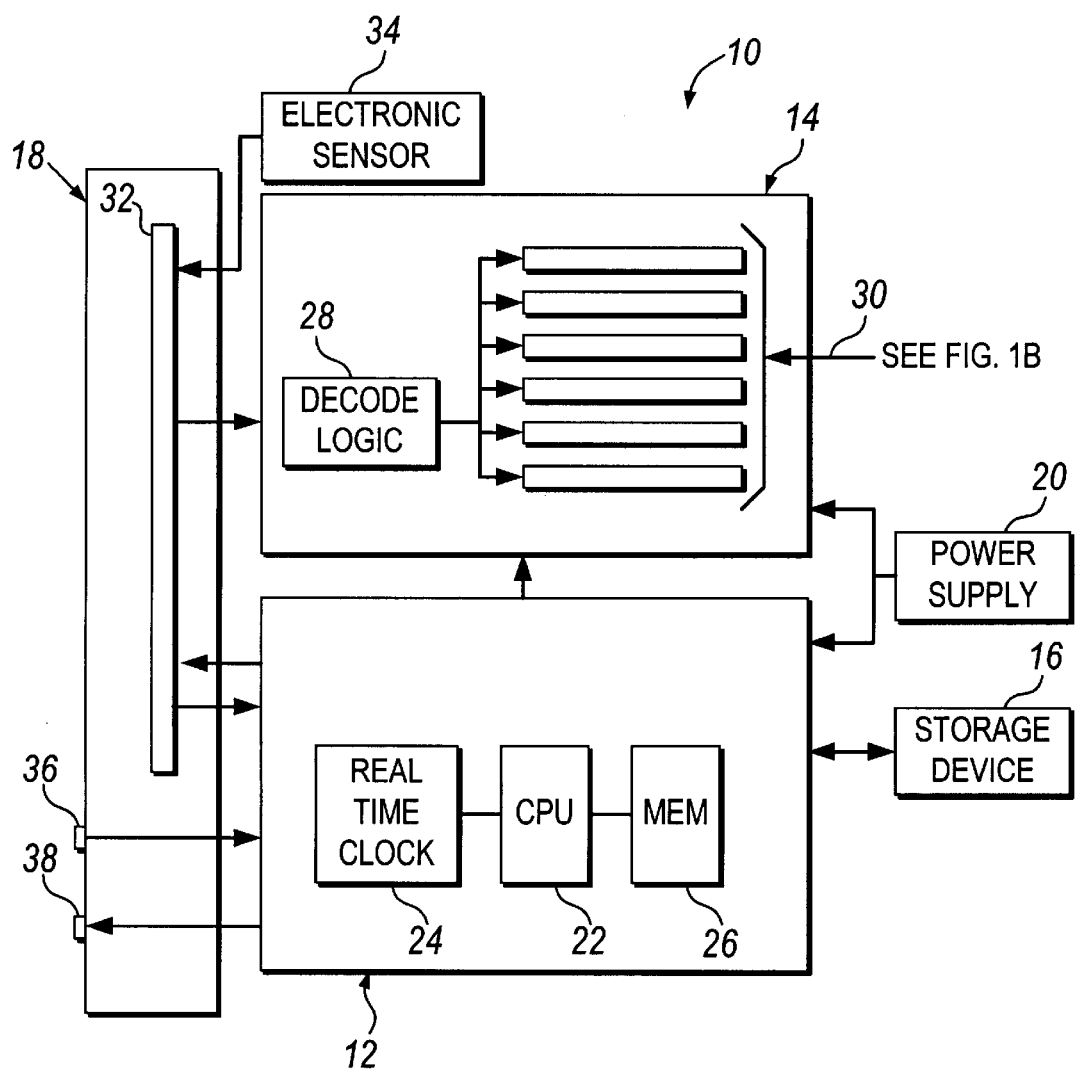
FIG. 1A is a schematic view of a system for monitoring a business meeting, in accordance with the present invention.
Figure 1B:
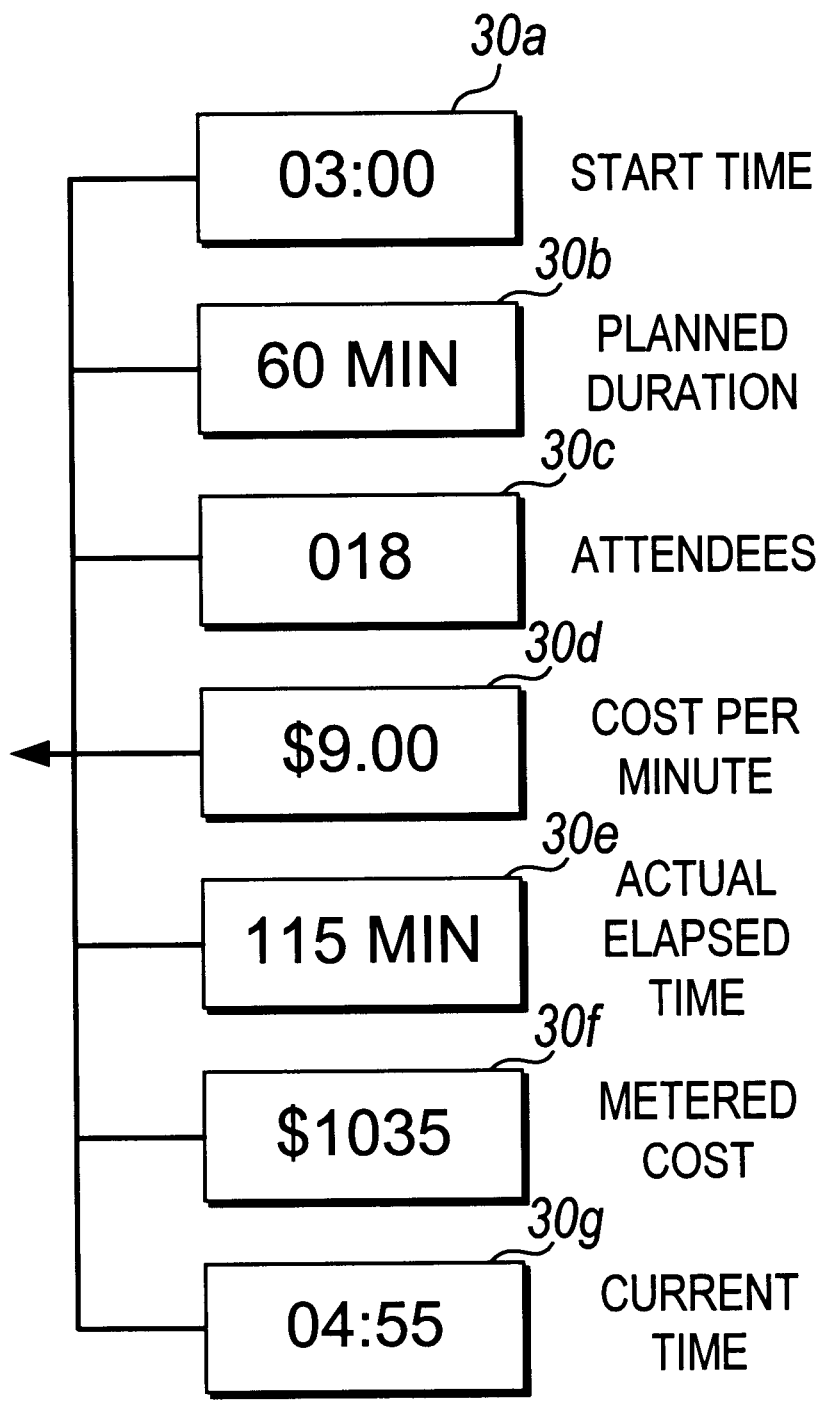
FIG. 1B is a schematic detail of a display for the system of FIG. 1A, displaying a number of predetermined parameters.

Turning now to the drawings, FIGS. 1A and 1B show a preferred embodiment of a system 10 for monitoring a business meeting or similar group activity, in accordance with one aspect of the present invention. Generally, the system 10 includes a computer 12, a display device 14, a storage device 16, an interface panel 18, an electronic sensor 34 and a power supply 20.

The computer 12 is preferably a single board computer, such as an IBM-compatible computer in half size AT format. The computer 12 includes a central processing unit (CPU) 22, such as an 80386SX microprocessor, real time clock (RTC) circuitry 24, and memory circuitry 26. In a preferred form, the memory circuitry 26 includes both dynamic random access memory (DRAM) and read only memory (ROM) (not shown). The DRAM may be used in conjunction with the CPU 22 to execute application software, while the ROM may be used to store and/or execute basic input/output system firmware used by the computer 12. Alternatively, the computer 12 may be provided from a plurality of discrete and/or solid state components (not shown), as will be appreciated by those skilled in the art.

The display device 14 is preferably a plurality of seven liquid crystal displays (LCD's) 30 coupled to decoder circuitry 28. In a preferred form, each LCD 30 includes an LCD printed circuit board (PCB) that contains an LCD controller, LCD and header (not shown). Maxim Semiconductor, for example, manufactures an LCD controller, Model No. ICM7211AMIPL, which may be provided for each LCD 30. Alternatively, other display devices may be used, such as light emitting diode (LED) displays, liquid crystal diode displays, mechanical numerical displays, and the like.

The interface panel 18 preferably includes a passive backplane having slots into which the computer 12, display 14, and/or other components of the system 10 may be plugged or otherwise coupled. A bus 32, such as an Industry Standard Architecture (ISA) bus, may be provided on the interface panel 18 for coupling and/or allowing communication between the various components of the system 10. The interface panel 18 may also include an input port 36 and/or an output port 38 coupled to the computer 12 directly or through the bus 32 for uploading and downloading data, respectively, or a single input/output device (not shown) may be provided.

The decoder circuitry 28 may be coupled to the bus 32 to receive and interpret data from the computer 12 to be displayed on the LCD's 30. The decoder circuitry 28 may be a bus arbitration printed circuit board, and preferably a complex programmable logic device (CPLD), which may be coupled to the bus 32 and to the LCD's 30 for providing interface signals to the LCD controllers. The decoder circuitry 28 preferably decodes addresses assigned to each LCD in response to the data received from the bus 32 and periodically refreshes each LCD accordingly. The parameters displayed on the LCD's 30 are maintained on the respective LCD controller until changed by the decoder circuitry 28, and the LCD controllers control, preferably automatically, LCD biasing and signal timing, as will be appreciated by those skilled in the art.

The storage device 16, preferably a disk drive, such as a hard drive or a floppy drive, is coupled to the computer 12 and may be used to store application software executed by the computer 12. Other data may also be stored on the storage device 16, such as data on potential attendees, or planned start time and duration, as explained further below. The power supply 30 is coupled to one or more components of the system 10, such as the computer 12 and/or the display 14, to provide electrical power to the components as needed.

The electronic sensor 34 is coupled to the computer 12, preferably via the bus 32, for inputting attendee identification data. In a preferred form, the electronic sensor 34 is a bar code reader (not shown), although alternatively a magnetic strip reader, a biosensor, such as a fingerprint reader, and the like may also be provided. The electronic sensor 34 may facilitate the convenient input of information identifying attendees of a meeting activity and/or of other attendee data, as explained further below. In an alternative form, a keyboard or a single or multiple button electronic pad (not shown) may be used for manually entering attendee information, instead of the electronic sensor 34.

As shown in FIG. 1, the display 14 of the system 10 may be used to display a number of predetermined parameters related to a business meeting. For example, the system 10 may display start time 30a, planned duration 30b, number of attendees 30c, total unit time cost 30d (e.g., cost per minute), actual elapsed time 30e, cumulative or metered cost 30f, and current real time 30g.

Figure 2:
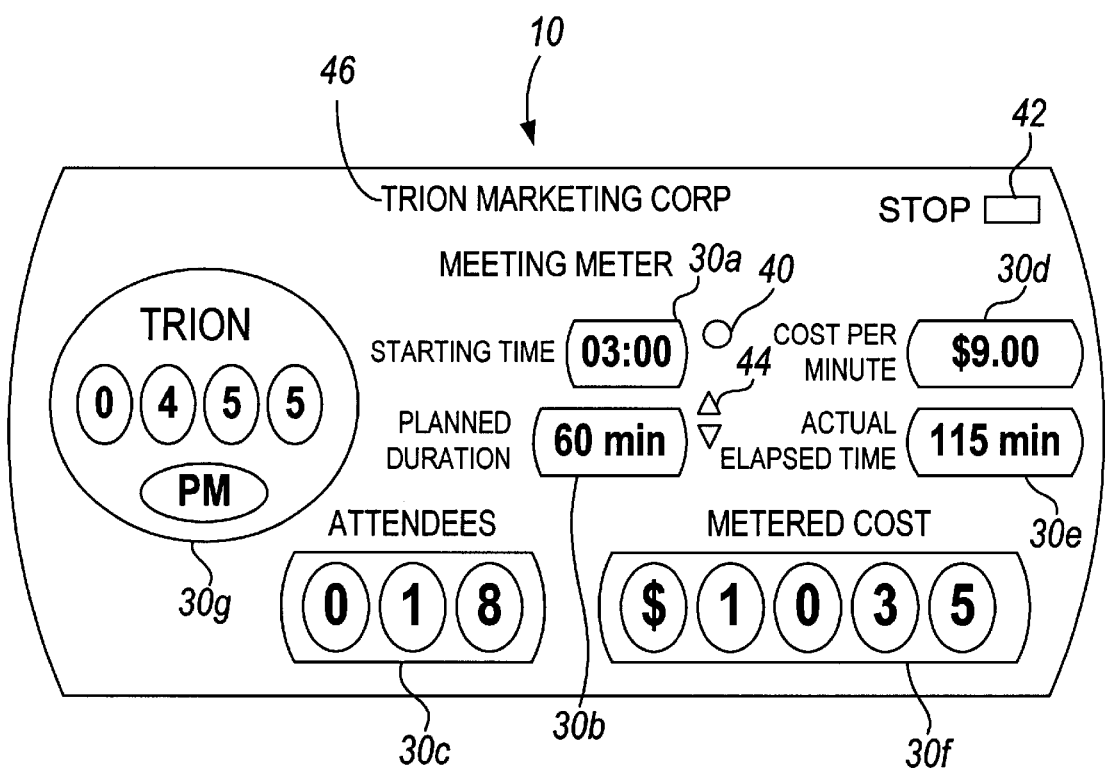
FIG. 2 is a top view of a system for monitoring a business meeting, including a display for a number of predetermined parameters.

Turning to FIG. 2, a preferred form of the system 10 is shown which prominently displays the cumulative cost 30f and the number of attendees 30c, as well as the current real time 30g. In addition, the system 10 also includes a "stop" button 42 and/or other input mechanism (not shown) for activating and/or deactivating the monitoring function of the system 10, respectively. An incremental input device, such as a pair of "up" and "down" buttons 44 or a dial 40, may also be provided adjacent to one or more of the LCD's 30 to set a selectable parameter, such as the planned duration 30b, and the start time 30a. The system 10 may also include an organization's logo 46 and/or may be provided in a variety of shapes and sizes, as will be appreciated by those skilled in the art.

Thus, the system 10 may be placed in a prominent manner at a meeting site, e.g., on a conference table or wall in a meeting or conference room, for attendees of a business meeting or similar activity to see. The system 10 may simultaneously display a number of dynamic and critical cost and time parameters associated with a meeting or similar activity, such as the parameters 30a–30g above. Although the system 10 is preferably silent, it provides a visual and constant reminder of the cumulative cost of the meeting activity to those conducting and those attending. For this reason, the system 10 may facilitate keeping the momentum of a meeting agenda-focused and productive. In a further alternative, the system may include an audio output device, such as a speaker, for providing periodic audio display of one or more parameters, such as a periodic chime to indicate elapsing time.

Preferably, the system 10 is adapted for integration into an organization's computer network. For example, the system 10 may be coupled to a server, mainframe or other network computer system (not shown) during use, e.g., via the input and output ports 36, 38, allowing a meeting to be monitored from a remote and/or central location. Alternatively, the system 10 may be selectively connected to a computer or network, e.g., to download parameter or attendee data monitored by the system 10 after a meeting and/or to upload software and/or data into the computer 12 and/or the storage device 16 prior to a meeting.

Figure 3:
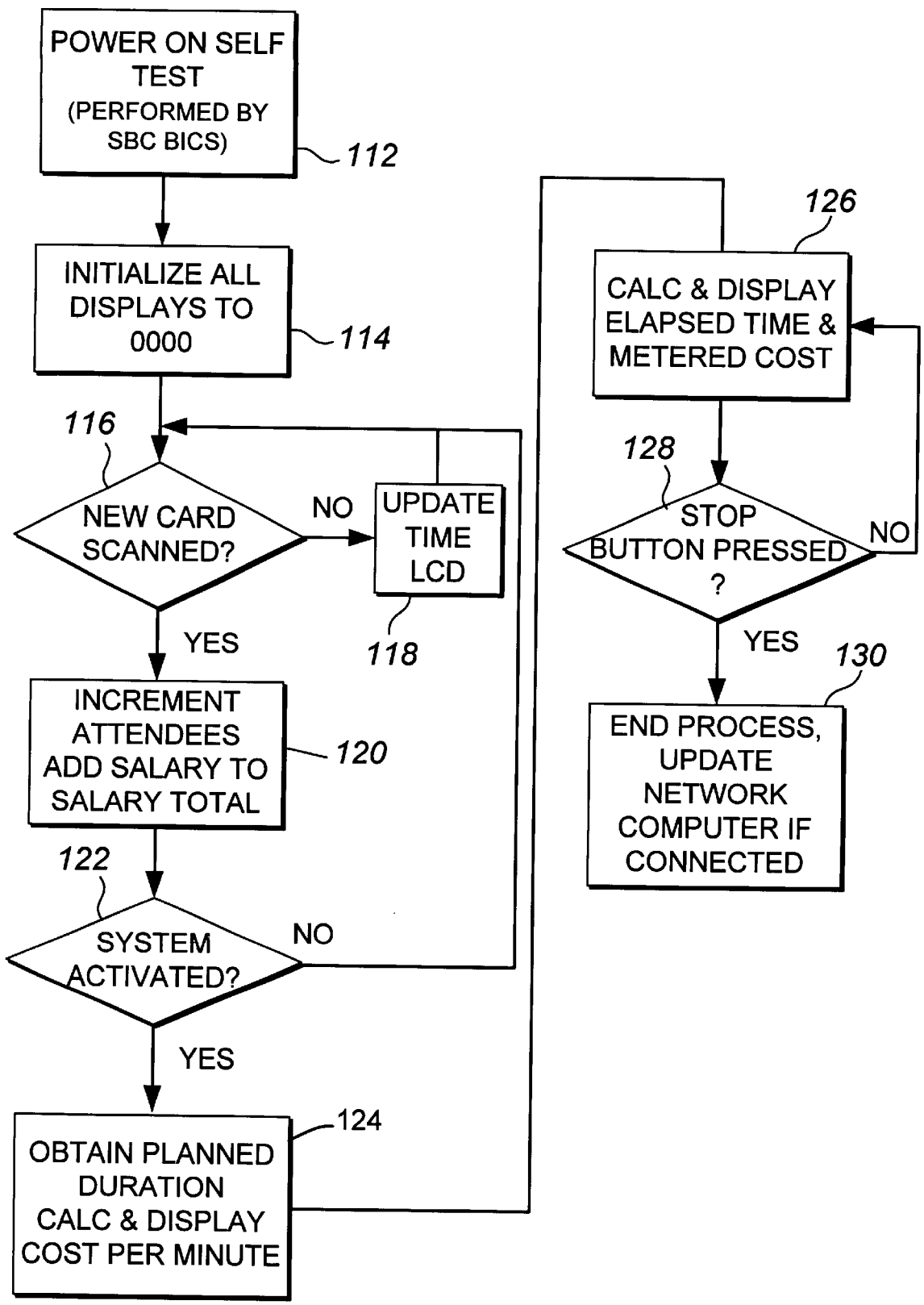
FIG. 3 is a flow diagram of a method for monitoring a business meeting, in accordance with the present invention.

Turning to FIG. 3, a method 110 for monitoring a business meeting is shown, demonstrating the general operation of the system 10 of FIGS. 1A and 1B, to which reference is also made. Initially, when the system 10 is turned on, the computer 12 may perform a self test 112 to confirm integrity of the hardware components and/or software of the system 10. As indicated at 114, the decoder circuitry 28 may then initialize the LCD's 30a–30f (see FIG. 1B) to zero ("0"), and the computer 12 may obtain the current real time from the RTC circuitry 24 and communicate it to the decoder circuitry 28 for display on LCD 30g.

The computer 12 may await entry of attendee identification data before beginning to monitor a meeting. For example, each attendee may have an identification card having a bar code, a magnetic strip and the like thereon which includes individual identification data, such as their name, their department or affiliation within the organization, accounting codes and/or their individual unit time cost data, e.g., including their hourly salary, wages, benefits, overhead and the like. Alternatively, each identification card may simply include an individual identifier code for the respective attendee, and the computer 12 or storage device 16 may include a database of attendee identification data corresponding to a plurality of individual identifier codes.

The computer 12 may then perform the step 116 of periodically checking whether attendee identification data has been input, e.g., whether an identification card has been scanned by the electronic sensor 34. If not, the computer 12 may periodically, e.g., every minute, obtain the current real time from the RTC circuitry 24, which may be displayed on the LCD 30g. If an identification card is scanned by the electronic sensor 34, e.g., when an individual attendee arrives at the meeting site and swipes their individual identification card through the electronic sensor 34, the computer 12 may acquire and store the corresponding individual identification data or identifier code in the memory circuitry 26. Alternatively, individual identification data or an individual identifier code may be manually input, e.g., using a keyboard or keypad.

As indicated at 120, each time an identification card is scanned, a total number of attendees parameter may be increased and stored in the memory circuitry 26. The individual unit time cost data of each attendee may also be added to a total unit time cost parameter stored in the memory circuitry 26, i.e., thereby increasing the total unit time cost parameter by a predetermined value corresponding to the unit time cost of the added attendee. The computer 12 may communicate the total number of attendees and/or total unit time cost parameters to the decoder circuitry 28, which may then display the parameters on LCD's 30c, 30d, respectively. In addition, the computer 12 may monitor the identity of the individual attendees, e.g., by storing their name and/or department or accounting code data in the memory circuitry 26 or the storage device 16 to create an attendee database.

If an individual attendee's identification card is scanned a second time, the computer 12 may identify that the respective individual is already an attendee, and interpret this action to indicate that the individual is withdrawing from the meeting. Consequently, the total number of attendees and total unit time cost parameters may be decreased accordingly. Information indicating the withdrawal may also be stored in the attendee database.

The system 10 may then perform an activation inquiry step 122, preferably comparing a start time parameter set for the meeting activity with current real time acquired from the RTC circuitry 24. For example, the start time and planned duration parameters may be manually input into the system using the dial 40 and the buttons 42, shown in FIG. 2, or may be uploaded into the system 10 in preparation for a meeting activity. Once the current real time reaches the start time, the system 10 may automatically activate, and begin to monitor and/or display meeting parameters. Alternatively, once one or more data entries have been received indicating attendees are present at a meeting activity, the system 10 may automatically activate, or the system 10 may inquire whether a start button (not shown) has been pressed. If the system 10 has not been activated, the system 10 may continue to await entry of additional attendee identification data, update the current real time, and/or periodically perform the activation inquiry step again.

When the start time has been reached, the computer 12 may begin to perform a periodic loop 126 to calculate and display time and/or cost parameters accumulating during the meeting. Alternatively, if a manual start button is provided, the system 10 may acquire the start time from the RTC circuitry 24 when the start button is pressed. The start time parameter may be stored in the memory circuitry 26 and/or displayed on LCD 30a. The planned duration for the meeting activity may be input, for example, manually using button pads, such as the arrow buttons 44 shown in FIG. 2, stored in the memory circuitry 26 and/or displayed on LCD 30b. Alternatively, the computer 12 may calculate and display the total unit time cost and total number of attendees parameters for the first time after the system 10 has been activated, rather than previously.

During the periodic loop 126, the current real time may be acquired from the RTC circuitry 28 and compared to a real time value acquired during a previous loop. If the real time values are the same, no calculations may be performed. Once the real time values are different, e.g., after the passage of a periodic time interval, preferably a one minute interval, the computer 12 may begin to perform a number of predetermined calculations.

Thus, after each periodic time interval, the computer 12 may calculate a periodic total cost, e.g., by multiplying the total unit time cost parameter by the periodic time interval. The periodic total cost may be added to a previously stored metered cost parameter (from all previous elapsed time periods) to provide a current metered cost parameter. The computer 12 may also calculate an elapsed time parameter by acquiring the current real time from the RTC circuitry 24 and comparing it to the start time parameter. The current metered cost and the elapsed time parameters may then be stored in the memory circuitry 26 and/or displayed on LCD's 30f, 30e, respectively.

Alternatively, to simplify the system 10 and where the number of attendees may not change during a meeting, the computer 12 may simply calculate the elapsed time since the start time and multiply the elapsed time by the total unit time cost of the attendees stored when the meeting started. However, where attendees may arrive and/or withdraw during the course of a meeting, it may be desirable to periodically update the number of attendees and the total unit time cost parameters. For example, after each periodic time interval or alternatively each time an identification card is scanned, the computer 12 may cumulatively calculate and tabulate the periodic total cost for each finite element of time since the start time parameter, in order to more accurately reflect the actual metered cost to the organization of the meeting.

During another step 128, the computer 12 may periodically check whether the stop button has been pressed. As long as the stop button is not pressed, the system 10 will continue to periodically update, store and display the predetermined time and cost parameters associated with the meeting, such as those parameters described above. When the stop button is finally pressed, the system 10 may store the final parameters and/or freeze the LCD's 30 at the final parameters until reset or the system 10 is turned off.

If the system 10 is coupled to a network computer, as indicated at 130, the computer 12 may download stored data to the network computer, such as the attendee identification data, the number of attendees, the elapsed time, and/or the metered cost parameters of the meeting. Alternatively, the stored data may be retained in the memory circuitry 26 for later retrieval or downloading.

Thus, a system and method in accordance with the present invention may facilitate the tabulation, recording and/or display, in real time, of the time and cost to an organization of one or more meeting activities. The organization may use a plurality of systems, for example, one at each of its meeting sites, e.g., provided in each of its conference or meeting rooms, to monitor each of its meeting in progress. The systems may be permanently mounted in each meeting site, or may be transported to a meeting site in preparation for a meeting activity.

If the systems are monitored from a remote location, e.g., by coupling the systems to the organization's computer network system, several meetings may be monitored simultaneously. Staff in attendance may be monitored to assist in locating specific individuals, such as executives who may be needed elsewhere than at a meeting site. Time and cost parameters may be monitored in real time, tabulated into the organization's accounting system, management information system, and the like.

A system in accordance with the present invention may also improve accountability within an organization, and thereby increase productivity. For example, with a system prominently displayed at a meeting site, persons conducting a business meeting at the meeting site may be constantly aware of the time and costs being displayed before them, including the current running time of the meeting as compared to its planned time and the accumulated time of all attendees, the number of people in attendance, and the accumulating cost to the organization.

When the data acquired by the system is downloaded or monitored from a central location, e.g., by a company's accounting or management information personnel, the data may include:

the identity of the person chairing the meeting to promote responsibility and accountability, a statement of the meeting's purpose, which may be reviewed in light of the time and cost of the meeting to reflect the relative importance and timeliness of the meeting, the running time as compared to the scheduled duration which may indicate the measure of issue/subject control, the number and identity of attendees to reduce the likelihood of packing the meeting with redundant or information-only attendees, and ensure the meeting stays relevant to its stated purpose, the arrival and departure of each attendee to improve punctuality, and the cumulative cost to the organization of the meeting in actual or burdened dollars.

Analytical reports may be produced from the data, enabling the organization to analyze this costly, yet vital, business activity, which may lead to improved communication and productivity.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A method for monitoring an activity at a site attended by one or more attendees, the method comprising the steps of:

increasing or decreasing a total unit time cost parameter by individual unit time cost data corresponding to each attendee when each respective attendee arrives at or withdraws from the site, respectively;

adding individual identification data identifying each attendee to an attendee database when each respective attendee arrives at the site;

monitoring an elapsed time parameter of the activity;

calculating a metered cost parameter of the activity based upon the total unit time cost and elapsed time parameters; and monitoring at least one of the attendee database, the elapsed time parameter, and the metered cost parameter from a remote location.

2. The method of claim 1, comprising the additional steps of:

increasing or decreasing a total number of attendees parameter when an attendee arrives at or withdraws from the site, respectively; and displaying the total number of attendees parameter.

3. The method of claim 1, wherein the elapsed time comprises a plurality of periodic time intervals, and wherein the metered cost parameter is calculated by periodically comparing current values of the total unit time cost parameter with the respective periodic time intervals.

4. The method of claim 1, wherein each attendee has an identification device including individual unit time cost data thereon, and wherein an electronic sensor is provided at the site for reading the identification device for acquiring the individual unit time cost data.

5. The method of claim 4, comprising the additional step of scanning the identification device of each attendee with the electronic sensor when each attendee arrives at the site, thereby acquiring the individual unit time cost data and individual identification data of the respective attendee.

6. The method of claim 5, wherein the individual identification data of each attendee is stored in the attendee database when the identification device of each attendee is scanned.

7. The method of claim 5, wherein the electronic sensor comprises a bar code reader, and wherein the identification device comprises an individual identification card including a bar code comprising the individual unit time cost data thereon.

8. The method of claim 1, wherein the attendee database is monitored from the remote location to locate a selected attendee at the site.

9. The method of claim 1, comprising the additional step of displaying the metered cost parameter and the elapsed time parameter of the activity at the site.

10. A system for monitoring an activity attended by one or more attendees, comprising:

an interface for entering individual identification data identifying each attendee attending the activity;

memory for storing the individual identification data of each attendee to create an attendee database;

a processor coupled to the memory and interface for determining a cumulative cost parameter of the activity based upon individual unit time cost data of each attendee and an elapsed time of the activity; and a remote computer system coupled to the processor and memory for receiving at least one of the attendee database, the elapsed time, and the cumulative cost parameter of the activity.

11. The system of claim 10, wherein the remote computer system is configured for monitoring the individual identification data to locate a specific individual attending the activity.

12. The system of claim 10, wherein the remote computer system is configured for monitoring arrival and departure of each attendee attending the activity.

13. The system of claim 10, wherein the interface comprises an electronic sensor for scanning an identification device of each attendee to acquire the individual identification data and the individual unit time cost data of the respective attendee.

14. The system of claim 13, wherein the processor is configured for automatically increasing or decreasing a total unit time cost parameter used to calculate the cumulative cost parameter each time an identification device is scanned by the electronic sensor.

15. The system of claim 10, further comprising a storage device for storing individual unit time cost data of a plurality of potential attendees, and wherein the processor is configured for extracting the individual unit cost time data of a respective attendee from the storage device when individual identification data is entered.

16. The system of claim 15, wherein the remote computer system is configured for uploading the individual unit time cost data of a plurality of potential attendees into the storage device prior to the activity.

17. The system of claim 10, further comprising an audio output device for providing a periodic audio display to indicate elapsed time.

18. The method of claim 1, further comprising transferring at least one of the individual identification data of each attendee, the elapsed time parameter, and the total metered cost parameter to the remote location upon conclusion of the meeting.

19. The method of claim 18, further comprising generating analytical reports at the remote location based upon the transferred data.

20. The method of claim 1, wherein the attendee database is monitored from the remote location to monitor arrival and departure of each attendee attending the activity.

* * * * *